United States Patent [19]

Gibson

[11] Patent Number: 5,063,446
[45] Date of Patent: Nov. 5, 1991

[54] APPARATUS FOR TRANSMITTING AUXILIARY SIGNAL IN A TV CHANNEL

[75] Inventor: James J. Gibson, Princeton, N.J.

[73] Assignee: General Electric Company, Princeton, N.J.

[21] Appl. No.: 392,500

[22] Filed: Aug. 11, 1989

[51] Int. Cl.$^5$ .................. H04N 7/07; H04N 7/06; H04N 7/04

[52] U.S. Cl. .................. 358/142; 358/143; 358/144

[58] Field of Search ............ 358/12, 141, 142, 143, 358/144, 197, 198; 375/39, 42, 43; 370/11, 20

[56] References Cited

U.S. PATENT DOCUMENTS

| | | | |
|---|---|---|---|
| 2,635,140 | 4/1953 | Dome | 178/5.2 |
| 3,231,818 | 1/1966 | Court | 325/33 |
| 3,478,166 | 11/1969 | Reiter et al. | 178/5.1 |
| 4,661,850 | 4/1987 | Strolle et al. | 358/140 |

FOREIGN PATENT DOCUMENTS 281696 12/1986 Japan.
10986 1/1988 Japan.

OTHER PUBLICATIONS

Craig C. Todd, "A Compatible Digital Audio Format for Broadcast and Cable Television", IEEE Transactions on Consumer Electronics vol. CF-33, No. 3, Aug. 1987, pp. 297-305.

(Translation) "Digital Sound Signals Multiplexed in Quadrature with TV Signals" Hitachi, Ltd., ITEJ 17 ∝ 6-88.

Primary Examiner—John W. Sheppard
Assistant Examiner—Michael D. Parker
Attorney, Agent, or Firm—Joseph S. Tripoli; Eric P. Herrmann; James B. Hayes

[57] ABSTRACT

Apparatus for converting a signal having a substantially continuous frequency spectrum to a signal having its energy concentrated at multiples of the line frequency of a video signal, includes circuitry for apportioning the signal into two intermediate signals including, in part, mutually exclusive portions of the original signal and inverting the polarity of portions of the signal. The two intermediate signals are thereafter used to quadrature phase modulate a carrier of multiple line frequency to generate a signal for combining with a video signal for transmission.

16 Claims, 6 Drawing Sheets

FIG. 4

| Fit | | | | | | | |
|---|---|---|---|---|---|---|---|
| INPUT | A | B | C | D | E | F | |
| S1 | A | -A | C | -C | E | -E | |
| S2 | | B | -B | D | -D | F | |
| S3 | A/2 | B/2 | C/2 | D/2 | E/2 | F/2 | |
| ODE | | A/2 | B/2 | C/2 | D/2 | E/2 | |
| S4 | | -A/2 | -B/2 | -C/2 | -D/2 | -E/2 | |
| ADD | | 0 | 0 | 0 | 0 | 0 | |
| SUB | | A | B | C | D | E | |

APPARATUS FOR TRANSMITTING AUXILIARY SIGNAL IN A TV CHANNEL

This invention relates to an apparatus for transmitting auxiliary information in a television signal.

BACKGROUND OF THE INVENTION

This invention will be described in terms of combining an auxiliary (e.g., digital) audio signal with a standard television signal for transmission purposes, however it should be appreciated that the invention is not intended to be limited to this application.

P. R. J. Court, in U.S. Pat. No. 3,231,818 describes a subscription television system wherein the normal audio carrier is encoded with subscription information and program sound is provided on a frequency modulated carrier placed in the vestigial sideband of the television signal. In this instance the frequency modulated carrier is located at 1.0 MHz below the picture carrier.

R. B. Dome, in U.S. Pat. No. 2,635,140 describes a television signal format wherein blue picture signal is modulated on a carrier located in the vestigial sideband of a green picture signal. Dome recognized that the energy of TV signals is concentrated in spectral bands located at integral multiples of the horizontal line frequency. He further recognized that, to effectively separate the signals, it would be advantageous to condition the blue signal to fall between the spectral bands occupied by the green picture signal. Since the blue picture signal is a TV signal, its energy is also concentrated in spectral bands at integral multiples of the line frequency. Locating the blue picture signal between the spectral bands of the green picture signal is accomplished by locating the green picture signal carrier at an odd multiple of one-half the line frequency.

It follows that to effectively separate an auxiliary signal (e.g., a sound signal), combined with a TV signal, the energy of the auxiliary signal should be concentrated between the spectral bands of the TV signal.

However, the energy spectrum of analog sound signals is relatively flat over the frequency band which is typically 20 Hz to 20 kHz. If the sound signal is converted to digital format, e.g., binary, duo binary, etc., the spectral band representing the signal is appreciably broadened (e.g., 350 kHz). It does not occur concentrated in spectral bands located at multiples of the line frequency.

It is an object of the present invention to provide a method and apparatus for conditioning the energy of an auxiliary signal to be concentrated in spectral bands without loss of signal information content.

SUMMARY OF THE INVENTION

The present invention apportions auxiliary signal into two intermediate signals including, in part, mutually exclusive portions of said auxiliary signal and polarity inverts portions of the signal. Further apparatus quadrature phase modulates a carrier having a frequency which is a multiple of the line frequency of a video signal. The quadrature phase modulated signal is thereafter combined with a TV signal for transmission.

In a further embodiment of the invention apparatus for detecting the auxiliary signal, transmitted in a TV signal, includes detecting the received signal to generate baseband auxiliary signal. The baseband auxiliary signal is multiplied with two signals having a 90 degree phase relationship and a frequency which is a multiple of the line frequency. Portions of the products of the multiplication are delayed an integral number of line intervals and delayed and nondelayed products are combined to form recovered decoded auxiliary signal.

BRIEF DESCRIPTION OF THE DRAWINGS

FIG. 4 is a timing diagram useful in describing the operation of the circuitry of FIGS. 3 and 7.

DETAILED DESCRIPTION

Figure 1:
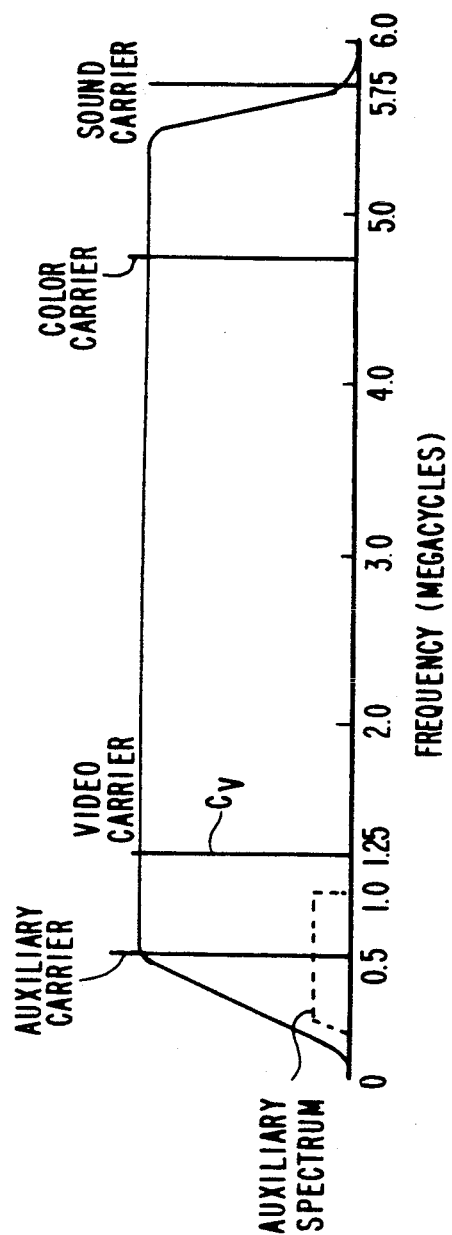
FIG. 1 is a spectral diagram showing the spectrum of a video channel including an auxiliary carrier in the vestigial sideband.

FIG. 1 shows the signal spectrum of a broadcast television signal which for NTSC is limited to a 6 MHz band. The television signal, ignoring the auxiliary carrier and its sidebands, includes luminance, chrominance and synchronizing components which are modulated on a video carrier. The modulated carrier is vestigial sideband filtered to remove signal frequencies in the lower sideband from approximately 0.75 MHz below the video carrier. A sound carrier is added to the video signal and resides at the upper extremity of the video channel. The television signal components located in the vestigial sideband spectra consist primarily of lower frequency luminance components which are concentrated in spectral bands centered on integral multiples of the horizontal line frequency.

The signal to be added, in accordance with this invention, is an auxiliary carrier shown (by way of example) centered at approximately 0.75 MHz below the video carrier. The sidebands of the auxiliary carrier are conditioned to occur between the spectral bands occupied by the luminance component. In the diagram the bandwidth of the auxiliary signal is shown to extend approximately 500 kHz on either side of the auxiliary carrier providing at least a 500 kHz information bandwidth. The auxiliary signal in this example is separated from the video carrier by 250 kHz to preclude interference therewith. This spacing or guardband prevents the auxiliary signal from producing undesirable interference in the audio signals of receivers having intercarrier sound detection systems.

Figure 2:
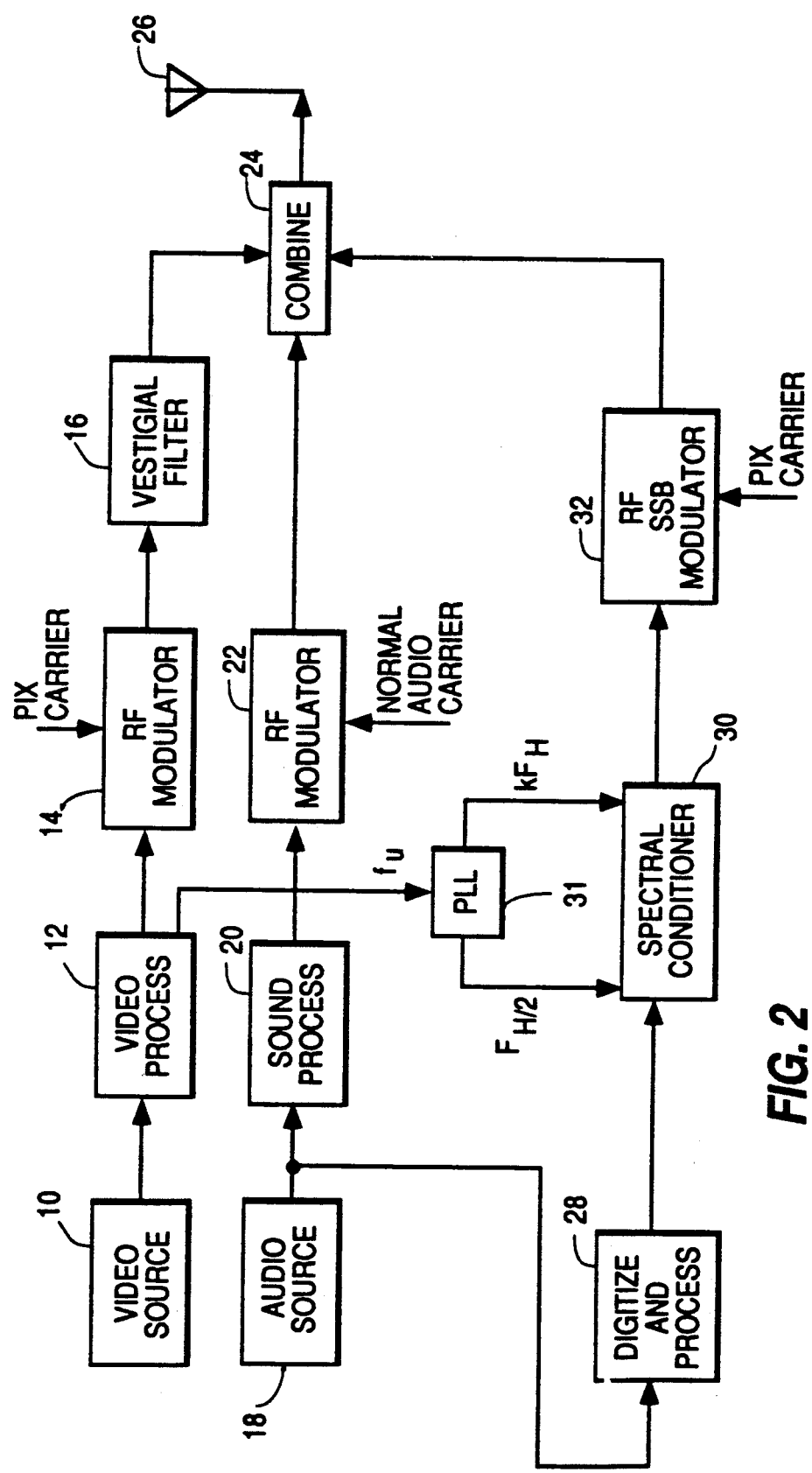
FIG. 2 is a block diagram of a video signal encoder including apparatus for adding an auxiliary digital sound signal to the vestigial sideband of the TV signal.

Refer to FIG. 2 which illustrates a generalized environment in which the invention may be implemented. In the exemplary system the invention is incorporated to encode an auxiliary sound signal for transmission with a TV signal. It is to be understood, however, that the invention may be utilized to encode any signal not having its energy concentrated at integral multiples of the horizontal line frequency for transmission in a TV signal.

In FIG. 2 the elements 10-26 form a standard TV signal encoder for generating and transmitting a standard TV signal. Video signal from a source 10, which may be a television camera is applied to a video processor 12. Video processor 12 generates a baseband composite video signal, including synchronizing components, and applies the composite signal to an RF modulator 14, which responsive to the composite signal amplitude modulates a radio frequency video carrier. The modulated video carrier is applied to a vestigial sideband filter which limits the frequency components of the modulated signal to conform to the spectrum shown in FIG. 1.

Audio signals from an audio source 18 are applied to a sound processor 20. Processor 20 may include compansion circuitry or other conventional circuitry to precondition the audio signal prior to transmission. The preconditioned audio signal from the sound processor 20 is applied to an RF modulator 22, wherein it frequency modulates a carrier having a frequency 4.5 MHz (NTSC) above the picture carrier frequency. The modulated composite signal from the vestigial filter and the modulated sound signal from the modulator 22 are applied to a signal combiner 24 which, absent an auxiliary signal, forms a standard TV broadcast signal.

The audio signal from the audio source 18 is also applied to a digitizer and processor 28 wherein the audio signal (or signals in the case of stereo signals) is digitized and formatted in serial form. The signal provided by the processor 28 may be in a binary bit stream format, in duo binary format, etc. The formatted signal is coupled to a spectral conditioner 30, which concentrates the energy of the applied signal in spectral bands centered on odd multiples of one-half the line frequency. The signal from the spectral conditioner 30 is applied to a modulator 32 which, responsive to the video carrier, produces a single sideband modulated carrier. The output of the modulator 32 is a carrier having a frequency approximately 0.75 MHz below the video carrier and modulated with the auxiliary signal. The signal from modulator 32 is applied to the combiner 24 wherein it is additively combined with the modulated composite video signal.

Figure 3:
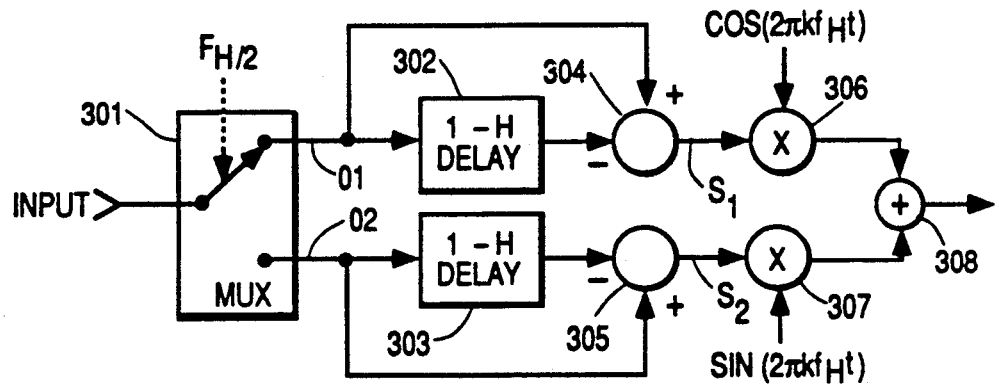
FIG. 3 is a block diagram of circuitry for concentrating the auxiliary signal in predetermined spectral bands.

FIG. 3 illustrates a first embodiment of the spectral conditioner 30 shown in FIG. 2. The circuitry of FIG. 3 (and FIG. 4) requires three operating signals; 1) a square wave signal ($F_H/2$) of half-line frequency, 2) a cosinusoidal signal of frequency $\omega = 2\pi k f_H$, where k is an integer and $f_H$ corresponds to the frequency of the signal $F_H$, and 3) a sinusoidal signal of frequency $\omega = 2\pi k f_H$. These three signals are generated in a conventional phase-locked-loop (PLL) circuit 31 (FIG. 2) responsive to a horizontal synchronizing signal $F_H$ provided by the video processor 12.

In FIG. 3, input signal is coupled to multiplexing circuitry 301, which, responsive to the signal $F_H/2$ alternately couples the input signal to connections 01 and 02 for periods of one horizontal line interval. The signal applied to connection 01 is coupled to the input connection of a one horizontal line interval delay element 302 and to the minuend input connection of a subtracter 304. The output connection of the delay element 302 is coupled to the subtrahend input connection of the subtracter 304. For one horizontal line interval prior to input signal being coupled to connection 01, no signal is coupled to connection 01. Therefore, at the beginning of each line interval that signal is applied to connection 01, the delay element 302 contains no data. Consequently during the line interval that signal is coupled to connection 01, delay element 302 applies no signal to the subtracter 304, and the signal applied to connection 01 passes through the subtracter 304 unaltered. During this line interval the data for this line interval is loaded into the delay element 302 and appears at the output of delay element 302 during the subsequent line interval. However, during the subsequent line interval the input signal is disconnected from connection 01 so that only signal provided by delay element 302 is coupled to subtracter 304. This signal is output by the subtracter with its polarity inverted. The output of substracter 304 is designated $S_1$ and illustrated in FIG. 4. Alternate horizontal line periods of signal are similarly processed by delay element 303 and subtracter 305. The output signal provided by the subtracter 305 is designated $S_2$ in FIG. 4.

In FIG. 4 the waveform labeled $F_H$ represents the horizontal synchronizing signal and the row of blocks labeled input represents the auxiliary signal. Each of the blocks A, B, C, etc., represents a horizontal line interval of signal information. The signals $S_1$ and $S_2$ represented by the rows of blocks designated $S_1$ and $S_2$ contain signal information from alternate lines of the input signal. It can be seen that there is 100 percent redundancy in the combined signals $S_1$ and $S_2$. Note that the elements in both signal paths pass fullband signals. Signal is coupled through one path or the other at all times so there is no loss of information. Also note that the combination of delay element and subtracter is arranged in the form of a subtractive 1-H comb filter, which as is well known passes signal energy in spectral bands centered at odd multiples of one-half the line frequency.

The signal $S_1$ from subtracter 304 is coupled to a multiplier 306 wherein it is multiplied by a carrier signal of constant frequency $kf_H$. The signal $S_2$ from subtracter 305 is coupled to a multiplier 307 wherein it is multiplied by a carrier signal of constant frequency $kf_H$ but 90 degrees out of phase with respect to the carrier signal applied to multiplier 306. Output signals from multipliers 306 and 307 are summed in an adder 308 to form a quadrature modulated output signal which is applied to the modulator 32 (FIG. 2).

Figure 5:
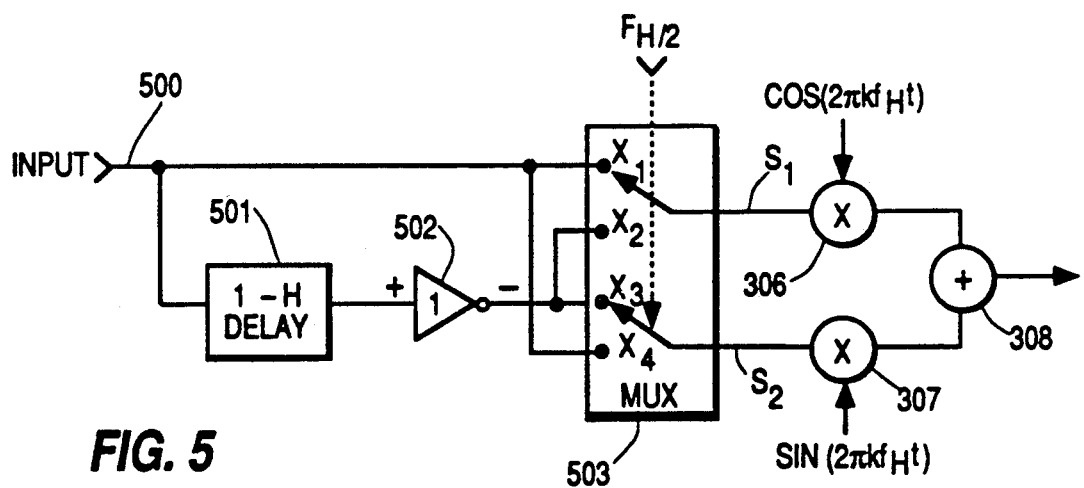
FIGS. 5 and 8 are block diagrams of alternate circuitry for concentrating the auxiliary signal in predetermined spectral bands.

FIG. 5 illustrates alternative circuitry for performing the same function as the FIG. 3 circuitry but with reduced hardware. In FIG. 5, input signal is applied to a connection 500 from which it is coupled to a one horizontal line period delay element 501 and to the input connections X1 and X4 of the switching circuit 503. Delayed signal from the delay element 501 is reversed in polarity by inverter 502 and coupled to the input connections X2 and X3 of the switching circuit 503. Switching circuit 503, responsive to an operating signal of frequency $F_H/2$, alternately couples input connections X1 and X2 to an output connection $S_1$ for successive line intervals. Switching circuit 503 also alternately couples input connections X3 and X4 to an output connection $S_2$ for successive line intervals. The signals at output connections $S_1$ and $S_2$ respectively conform to signals $S_1$ and $S_2$ in FIG. 4. The signals from connections $S_1$ and $S_2$ quadrature modulate a carrier signal of frequency $kf_H$ in elements 306, 307 and 308, the output of which is applied to the modulator 32 (FIG. 2).

The carrier of frequency $kf_H$ is phase locked to the horizontal frequency of the video signal and the operating signal $F_H/2$ applied to the multiplexers or switching circuits 301 and 503 is also phase locked to the horizontal frequency. By virtue of switching at $f_H/2$ and the subtractive comb filter function, the energy of the processed auxiliary signal falls in spectral bands at odd multiples of half the line frequency. Modulating the signals $S_1$ and $S_2$ at a frequency $kf_H$ translates the signal spectra by an integer multiple of the horizontal frequency. For $k=47$ the spectra is translated upward in frequency by approximately 0.75 MHz. When the translated signal is single side band (lower band) modulated by the video carrier, the auxiliary signal carrier is located at $kf_H$ below the video carrier and the auxiliary signal may be frequency interleaved with the luminance component, by simply additively combining the signals.

Figure 6:
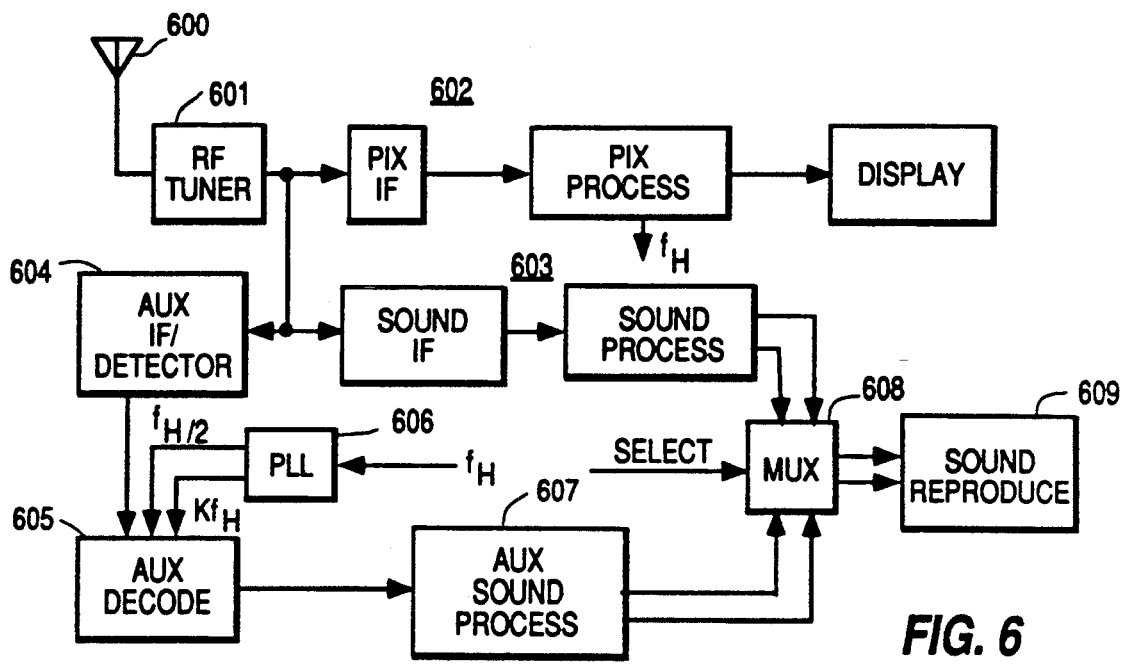
FIG. 6 is a block diagram of a receiver including circuitry for processing an auxiliary signal transmitted in the vestigial sideband of a TV signal.

FIG. 6 shows the receiving end of the system for transmitting an auxiliary signal in a standard TV signal. It is assumed that the auxiliary signal is a sound signal. In FIG. 6 the transmitted signal is received by an antenna 600 and coupled to a tuner section 601. The RF signal from the tuner is applied to a conventional video processor 602 for generating a visual display. Note that the auxiliary signal, being in the vestigial sideband is substantially attenuated by the Nyquist filter function of conventional picture IF circuitry and thus does not interfere with the picture processing.

The RF signal from the tuner is coupled to conventional sound processing circuitry 603 which extracts and processes the conventionally transmitted sound signal. Audio signals from the circuitry 603 are coupled to a multiplexer 608, the output of which is coupled to sound reproduction apparatus 609. The apparatus 609 may include amplifiers and speakers. The other input to the multiplexer is the auxiliary sound signal which under normal conditions, and being a digital signal, is assumed to be of higher quality than the conventionally transmitted sound signal. The multiplexer 608 is controlled by a SELECT signal which may be manually provided by the user of the receiver or internally generated as a function of, e.g. the signal/noise ratio of the auxiliary signal, the conventional sound signal or both, etc.

The RF signal from the tuner 601 is coupled to an auxiliary IF/detector circuit 604 which is tailored to respond to the vestigial sideband of the transmitted signal. The circuitry 604 produces baseband quadrature modulated auxiliary signal, by for example quadrature detecting the video carrier.

The baseband auxiliary signal is decoded in circuitry 605 responsive to signals of frequency $F_H/2$ and $kf_H$ provided by the phase locked loop 606. Decoded auxiliary signal is processed in circuitry 607 and coupled to the multiplexer 608. The processing circuitry 607 may include circuitry to decode, e.g., duo binary signals to parallel stereo signals, and digital-to-analog converters, etc.

Figure 7:
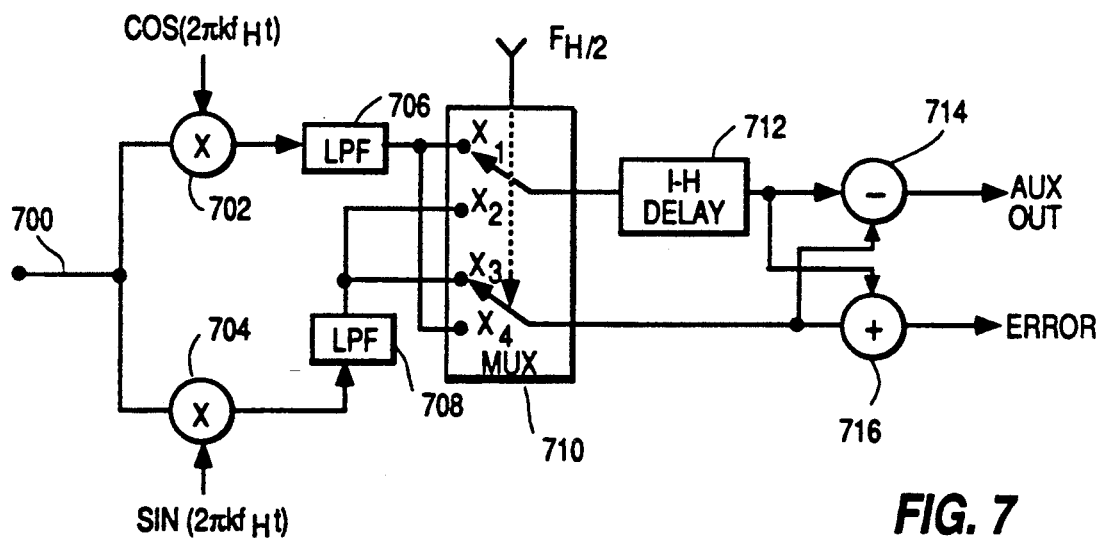
FIGS. 7 and 9 are block diagrams of alternate specific apparatus for recovering the auxiliary signal.

An example of the baseband auxiliary decoder 605 is illustrated in FIG. 7. Baseband auxiliary signal from the IF/DETECTOR circuit 604 is applied to connection 700 and coupled to multipliers 702 and 704. The auxiliary signal is multiplied in multipliers 702 and 704 by signals of frequency $kf_H$ and quadrature phase provided by the PLL circuit 606. Output signal from multiplier 702 is applied to a low pass filter 706, the output of which is coupled to the input connections X1 and X4 of a multiplexer or switching circuit 710. Output signal from multiplier 704 is applied to a low pass filter 708, the output of which is coupled to the input connections X2 and X3 of the multiplexer 710. The bandwidth of the low pass filters 706 and 708 is selected to pass the frequency components of signals $S_1$ and $S_2$ and is at least not substantially greater than $kf_H$. Letting $\omega=2\pi kf_H$, the received baseband auxiliary signal $S(t)$ can be described by $S(t)=S_1(t)\cos\omega t + S_2(t)\sin\omega t$. The product provided by the multiplier 702 is equal to $S_1(t)\cos^2\omega t + S_2(t)\cos\omega t\sin\omega t$, which can be converted, using trigonometric identities, to the form $S_1(t)/2 - S_1(t)\cos 2\omega t/2 + S_2(t)\sin 2\omega t/2$. Only the first term is passed by the filter 706. By similar analysis it can be shown that the signal provided by low pass filter 708 is equal to $S_2(t)/2$.

The multiplexer 710 alternately couples, at one-half the horizontal line rate, signals $S_1/2$ and $S_2/2$ to a one horizontal period delay element 712 and alternately couples the signals $S_2/2$ and $S_1/2$ to respective first input connections of an adder 716 and a subtracter 714. The output of delay element 712 is coupled to respective second input connections of the subtracter 714 and the adder 716. Referring to FIG. 4 the signal applied to the delay element 712 is designated $S_3$ and the signal applied to the first input connections of the adder 716 and the subtracter 714 is designated $S_4$. The output of the delay element 712 is designated ODE. The signals output by the adder and the subtracter are designated ADD and SUB, respectively. The output of the subtracter 714 is the decoded auxiliary signal and is formed by effectively averaging the redundant signals of opposite polarity. Note the auxiliary signal, attenuated by a factor of $\frac{1}{2}$, may be taken directly from the multiplexer 710 (either $S_3$ or $S_4$), however the averaged signal provided by subtracter 714 is likely to be more accurate in the presence of noise.

If the signal is transmitted without error, the output from the adder 716 will be zero. A nonzero output from adder 716 indicates a transmission error. The output of adder 716 may be monitored and, e.g., threshold detected to provide a control signal for corrective action or adaptive processing. For example, a threshold detected signal from adder 716 may be utilized to provide the SELECT control for multiplexer 608 (FIG. 6). (By threshold detection is meant the generation of a control signal if the level of the error signal from the adder 716 exceeds a predetermined level.)

Figure 8:
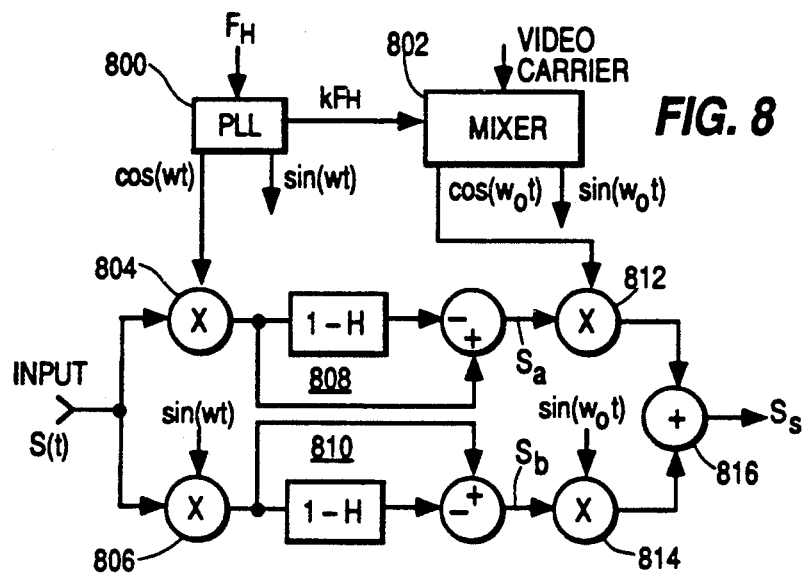
Figure 9:
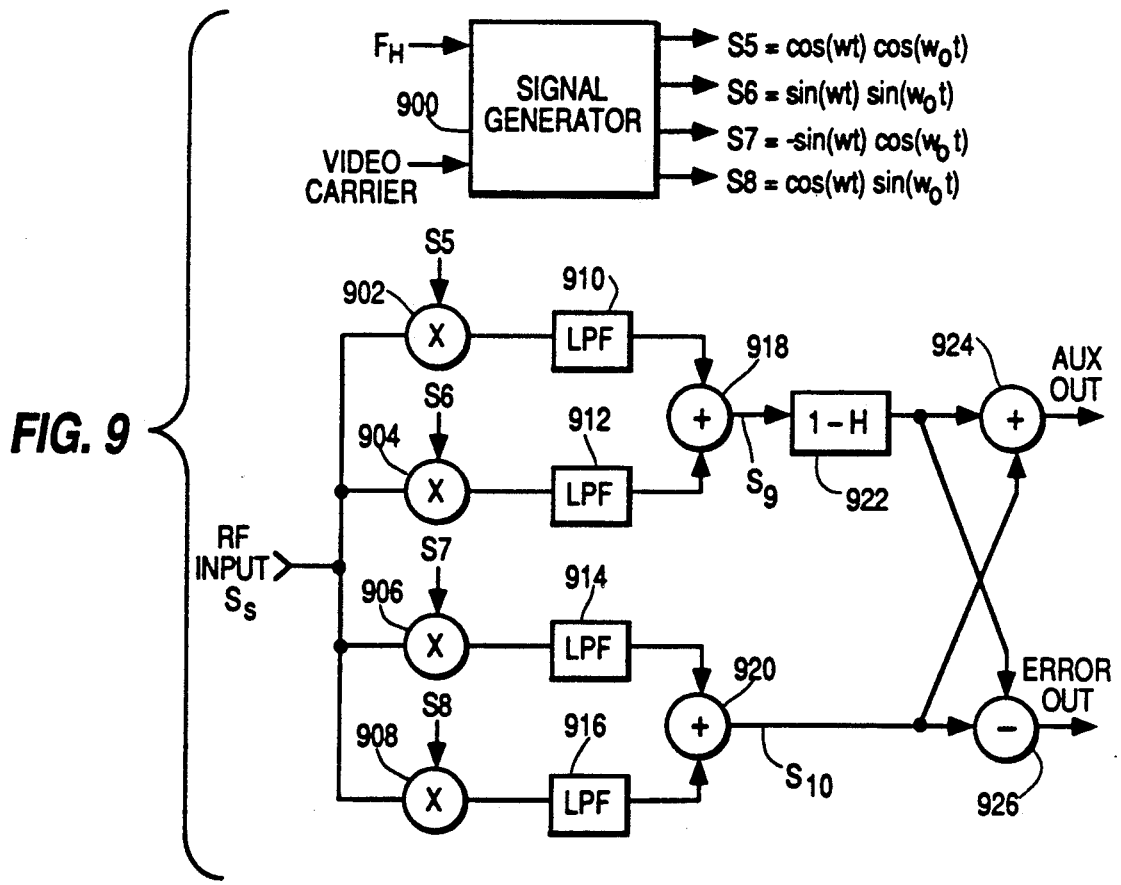

FIG. 8 illustrates a further auxiliary signal spectral conditioner circuit which may be implemented for element 30 in FIG. 2. FIG. 9 illustrates the inverse circuitry which may be implemented for element 605 in FIG. 6.

In FIG. 8 the angular frequency $\omega$ is defined $\omega + 2\pi nf_H/4$ where n is a small odd integer. The angular frequency $\omega_0$ is defined $2\pi(P-kf_H)$ where P is the frequency of the video carrier. Four operating signals $\cos(wt)$, $\sin(wt)$, $\cos(\omega_0 t)$ and $\sin(\omega_0 t)$ are required to generate the auxiliary signal for transmission. These signals are generated in a conventional manner by the PLL 800 and mixer 802 responsive to the horizontal synchronizing signal $F_H$ and the video carrier.

The auxiliary signal $S(t)$ is applied to respective input connections of two multiplier circuits 804 and 806. The signal $S(t)$ is multiplied by quadrature phase carriers of frequency, e.g., $f_H/4$. Note that the carrier frequency is, in general, significantly less than the bandwidth of the signal $S(t)$ and thus foldover or aliasing components are generated. However, because the quadrature components are available the aliasing components can be eliminated at the receiver. The signal products from the multipliers 804 and 806 are coupled respectively to subtractive 1-H comb filters 808 and 810. The comb filters 808 and 810 respectively produce the signals $S_a$ and $S_b$ defined by the equations:

$$S_a = S(t)\cos(\omega t) - S(t-H)\cos\omega(t-H)$$

$S_b = S(t)\sin(\omega t) - S(t-H)\sin\omega(t-H)$

However, $\cos\omega(t-H) = \sin(\omega t)$ and $\sin\omega(t-H) = \cos(\omega t)$ so that $S_a$ and $S_b$ may be rewritten:

$S_a = S(t)\cos(\omega t) - S(t-H)\sin(\omega t)$ $S_b = S(t)\sin(\omega t) + S(t-H)\cos(\omega t).$ The signals $S_a$ and $S_b$ are respectively coupled to the multiplier circuits 812 and 814 wherein they are multiplied by quadrature phase related signals of angular frequency $\omega_0$. The signal products from the multipliers 812 and 814 are summed in the adder 816, producing a modulated carrier $S_s$ which may be added directly to the modulated vestigial sideband video signal. The signal $S_s$ is described by the equation $S_s = S_a\cos(\omega_0 t) + S_b\sin(\omega_0 t)$ The auxiliary signal decoder in the receiver (FIG. 9) requires four operating signals designated $S_5$–$S_8$ defined:

$S_5 = \cos(\omega t)\cos(\omega_0 t)$ $S_6 = \sin(\omega t)\sin(\omega_0 t)$ $S_7 = -\sin(\omega t)\cos(\omega_0 t)$ $S_8 = \cos(\omega t)\sin(\omega_0 t)$ where the angular frequencies $\omega$ and $\omega_0$ are as defined with respect to the FIG. 8 circuitry. These four signals are generated by conventional methods in the signal generator 900, responsive to the horizontal synchronizing signal $F_H$ and the video carrier.

In the receiver RF signal from the tuner is bandpass filtered (to pass the vestigial sideband) and coupled to the auxiliary signal decoder input connection 901. This signal is applied to the respective input connections of multipliers 902, 904, 906 and 908 wherein it is multiplied by the signals $S_5$, $S_6$, $S_7$ and $S_8$, respectively. The signal products generated by the multipliers 902, 904, 906 and 908 are coupled respectively to similar low pass filters 910, 912, 914 and 916. The low pass filters 910-916 attenuate signal frequencies greater than the angular $\omega_0$. The design constraint of the filters is that they pass signal frequencies contained in the signal $S(t)\cos^2\omega t$.

Output signals from the low pass filters 910 and 912 are coupled to an adder 918. The sum of the signals, $S_9$, provided by adder 918 can be shown to be equal to $S_9 = \frac{1}{2}[S(t)\cos^2\omega t - S(t-H)\sin\omega t\cos\omega t + S(t)\sin^2\omega t + S(t-H)\sin\omega t\cos\omega t]$ collecting like terms $S_9 = \frac{1}{2}S(t)[\cos^2\omega t + S(t)\sin^2\omega t]$ or $S_9 = \frac{1}{2}S(t)[\cos^2\omega t + \sin^2\omega t] = S(t)/2$ Output signals from the low pass filters 914 and 916 are coupled to the adder 920 which generates a signal $S_{10}$ that can be shown to equal $S_{10} = S(t-H)/2$.

The signal $S_9$ is coupled to a one horizontal line delay element 922, which delays the signal $S_9 = S(t)/2$ and produces a delayed signal $S_9' = S(t-H)/2$. The signal $S_9'$ is coupled to respective first input connection of an adder 924 and a subtracter 926. The signal $S_{10}$ is coupled to respective second input connection of the adder 924 and the subtracter 926. The adder 924 produces the signal $S(t-H)$ which is equivalent to the desired signal delayed by one line interval. The subtracter 926 produces a zero valued signal except when transmission errors occur, in which case it produces an error signal.

Note in FIG. 9 the low pass filters 910–916 may be eliminated and two similar lowpass filters inserted after the adders 918 and 920.

In the claims the signal defined as having a substantially continuous frequency spectrum means a signal which does not have its energy concentrated at intervals of the horizontal frequency of a video signal, and in fact may not have a continuous frequency spectrum. That is, it may have holes and/or peaks in its spectrum.

What is claimed is:

1. Apparatus for frequency interleaving an auxiliary signal with a television signal, said auxiliary signal having a substantially continuous frequency bandwidth which is greater than a multiple of the horizontal line frequency of said video signal, said apparatus comprising:

means for providing said auxiliary signal and said video signal;

means for providing a horizontal synchronizing signal related to said video signal;

means including means, responsive to said auxiliary signal and said horizontal synchronizing signal, for apportioning said auxiliary signal to generate first and second signals each of which includes a mutually exclusive portion of said auxiliary signal, and includes polarity inverted portions of said auxiliary signal;

means responsive to said first and second signals and said horizontal synchronizing signal for generating a quadrature phase modulated signal; and means for combining said quadrature phase modulated signal with said video signal.

2. The apparatus set forth in claim 1 wherein said video signal is a vestigial sideband signal and said quadrature phase modulated signal is added to the vestigial sideband of said video signal.

3. The apparatus set forth in claim 1 wherein said means including means comprises:

a multiplexer coupled to said means for providing said auxiliary signal, and having first and second output terminals, for alternately providing said auxiliary signal to said first and second output terminals for intervals equal to the reciprical of said horizontal line frequency;

first and second delay elements respectively coupled to said first and second output terminals;

means coupled to an output terminal of said first delay element and to said first output terminal, for subtractively combining signals to generate said first signal; and means coupled to an output terminal of said second delay element and to said second output terminal, for subtractively combining signals to generate said second signal.

4. The apparatus set forth in claim 3 wherein said means for generating a quadrature phase modulated signal comprises:

means responsive to said horizontal synchronizing signals for generating first and second carrier signals having a 90 degree phase relationship and a frequency which is a multiple of the frequency of the horizontal synchronizing signal;

first multiplying means, responsive to said first carrier signal, for multiplying said first signal;

second multiplying means, responsive to said second carrier signal, for multiplying said second signal; and means for additively combining signals provided by said first and second multiplying means.

5. The apparatus set forth in claim 1 wherein the means including means comprises:

delay means having an input terminal for receiving said auxiliary signal and an output terminal for providing delayed and polarity reversed auxiliary signal;

switch means, having respective input terminals coupled to the input and output terminals of said delay means, having first and second output terminals for providing said first and second signals respectively, and responsive to said horizontal synchronizing signal for alternately connecting said first output terminal to said input and output terminals of said delay means at a rate equal to one-half said horizontal line frequency, and for alternately connecting said second output terminal to said output and input terminals of said delay means at a rate equal to one-half said horizontal line frequency.

6. The apparatus set forth in claim 5 wherein said means for generating a quadrature phase modulated signal comprises:

means responsive to said horizontal synchronizing signals for generating first and second carrier signals having a 90 degree phase relationship and a frequency which is a multiple of the frequency of the horizontal synchronizing signal;

first multiplying means, responsive to said first carrier signal, for multiplying said first signal;

second multiplying means, responsive to said second carrier signal, for multiplying said second signal; and means for additively combining signals provided by said first and second multiplying means.

7. The apparatus set forth in claim 1 wherein said means for combining said quadrature phase modulated signal with said video signal includes:

a source of an RF carrier signal; and means for modulating said RF carrier signal with said quadrature phase modulated signal.

8. Apparatus for frequency interleaving an auxiliary signal with a television signal, said auxiliary signal having a substantially continuous frequency bandwidth which is greater than a multiple of the horizontal line frequency of said video signal, said apparatus comprising:

means for providing said auxiliary signal and said video signal;

means for providing a horizontal synchronizing signal related to said video signal;

means responsive to said horizontal synchronizing signal for generating first and second operating signals having a 90 degree phase relationship and a frequency which is an odd multiple, including one of one-fourth of said horizontal line frequency;

first and second multiplying means responsive to said first and second operating signals, for multiplying said auxiliary signal;

a first subtractive comb filter coupled to an output of said first multiplying means for providing a first signal; and a second subtractive comb filter coupled to an output of said second multiplying means for providing a second signal;

means responsive to said first and second signals and said horizontal synchronizing signal for generating a quadrature phase modulated signal; and means for combining said quadrature phase modulated signal with said video signal.

9. Apparatus for converting the frequency spectrum of an auxiliary signal having a substantially continuous frequency bandwidth, to a frequency spectrum wherein its signal energy is concentrated at odd multiples of one-half the line frequency of a video signal, said apparatus comprising:

means for providing said auxiliary signal;

means for providing a video signal horizontal synchronizing signal having a frequency $f_H$;

delay means, responsive to said auxiliary signal, for providing polarity inverted auxiliary signal delayed by an integer multiple, including one of periods equal to the reciprocal of $f_H$;

switch means coupled for receiving said auxiliary signal and said polarity inverted delayed auxiliary signal, for providing at a first output terminal thereof, a first signal including periods of said auxiliary signal alternating with periods of said polarity inverted delayed auxiliary signal which periods correspond to said multiple of the reciprocal of $f_H$, and for providing at a second output terminal thereof, a second signal including periods of said polarity inverted delayed auxiliary signal alternating with periods of said auxiliary signal, which periods correspond to said multiple of the reciprocal of $f_H$;

means responsive to said horizontal synchronizing signal for generating first and second operating signals having a 90 degree phase relationship and a frequency which is a further multiple of $f_H$; and means responsive to said first and second signals and said first and second operating signals for generating a quadrature phase modulated signal having a carrier frequency equal to said further multiple of $f_H$, said quadrature phase modulated signal corresponding to said auxiliary signal with signal energy concentrated at odd multiples of one-half line frequency.

10. Apparatus for converting the frequency spectrum of an auxiliary signal having a substantially continuous frequency bandwidth, to a frequency spectrum wherein its signal energy is concentrated at odd multiples of one-half the line frequency of a video signal, said apparatus comprising:

means for providing said auxiliary signal;

means for providing a video signal horizontal synchronizing signal having a frequency $f_H$;

means for providing a video carrier signal of frequency $f_P$;

means responsive to said horizontal synchronizing signal for generating first and second operating signals having a 90 degree phase relationship and a frequency which is an odd multiple, including one, of one-fourth of said horizontal line frequency;

first and second multiplying means responsive to said first and second operating signals, for multiplying said auxiliary signal;

a first subtractive comb filter coupled to an output of said first multiplying means for providing a first information signal;

a second subtractive comb filter coupled to an output of said second multiplying means for providing a second information signal;

means responsive to said video carrier signal and said horizontal synchronizing signal for generating third and fourth operating signals having a 90 degree phase relationship and a frequency equal to the $f_P - kf_H$, where k is an integer; and means responsive to said first and second information signals and said third and fourth operating signals for generating a quadrature phase modulated signal, said quadrature phase modulated signal corresponding to an auxiliary carrier with its energy concentrated at multiples of half said horizontal line frequency.

11. In a receiver for detecting combined signals including an auxiliary signal and a television signal, said auxiliary signal representing an auxiliary signal having a substantially continuous frequency spectrum but having its energy concentrated at odd half multiples of the television signal line frequency for transmission, apparatus comprising:

means for receiving said combined signal;
means responsive to said combined signal for separating said auxiliary signal;
means responsive to said television signal for providing a horizontal synchronizing signal;
means responsive to said horizontal synchronizing signal for providing first and second operating signals having a 90 degree phase relationship and a frequency which is a multiple of the frequency of said horizontal synchronizing signal;
first and second multiplying means having respective output terminals, for respectively multiplying said auxiliary signal by said first and second operating signals;
switch means having first and second output terminals and having respective input terminals coupled respectively to the output terminals of said first and second multiplying means, said switch means alternately coupling its first output terminal to the output terminals of the first and second multiplying means for horizontal line periods and alternately coupling its second output terminal to the output terminals of said second and first multiplying means for horizontal line periods;
delay means coupled to the first output terminal of said switch means for delaying signal by integral horizontal line periods; and
signal combining means coupled to the delay means and the second output terminal of said switch means for providing an output auxiliary signal.

12. The apparatus set forth in claim 11 further including first and second low pass filters respectively coupled between said first and second multiplying means and said switch means.

13. The apparatus set forth in claim 11 further including further combining means coupled to said delay means and the second output terminal of said switch means for generating a signal indicating errors in transmitted auxiliary signal.

14. In a receiver for detecting combined signals including an auxiliary signal and a television signal, said auxiliary signal representing an auxiliary signal having a substantially continuous frequency spectrum but having its energy concentrated at odd half multiples of the television signal line frequency for transmission, apparatus comprising:

means for receiving said combined signal;
means responsive to said television signal for providing a horizontal synchronizing signal;
means for providing a video carrier signal;
means responsive to said horizontal synchronizing signal and said video carrier signal for generating first, second, third and fourth operating signals of the form $\cos(\omega t)\cos(\omega_0 t)$, $\sin(\omega t)\sin(w_0 t)$, $-\sin(\omega t)\cos(\omega_0 t)$ and $\cos(\omega t)\sin(_0 t)$ respectively where $\omega$ is an angular frequency corresponding to an odd multiple of said line frequency divided by four, and $\omega_0$ is an angular frequency corresponding to $P - kf_H$ where P is the video carrier frequency, k is an integer and $f_H$ is said line frequency;
first, second, third and fourth multiplying circuits respectively responsive to said first, second, third and fourth operating signals for respectively multiplying said received signal;
first adding means for adding signals provided by said first and second multiplying circuits;
second adding means for adding signals provided by said third and fourth multiplying circuits;
delay means coupled to one of said first and second adding means for delaying signal by an integer multiple of the reciprocal of said line frequency; and
combining means coupled to said delay means and the other of said first and second adding circuits, for providing said auxiliary signal having a substantially continuous frequency spectrum.

15. Apparatus for decoding a vestigial sideband video signal including a sound signal and, an auxiliary digital sound signal in the vestigial sideband comprising:

antenna and RF tuner circuitry for detecting said vestigial sideband video signal;
picture IF detector and processing circuitry, coupled to said tuner circuitry for generating baseband video signals;
sound IF detector and processing circuitry, coupled to said tuner circuitry for generating baseband sound signals from said sound signal included in said vestigial sideband video signal;
auxiliary IF detector and processing circuitry, coupled to said tuner circuitry for generating auxiliary baseband sound signals from said auxiliary digital sound signal in the vestigial sideband
sound reproduction means; and
means for selectively coupling said baseband sound signals or said auxiliary baseband sound signal to said sound reproduction means.

16. The apparatus set forth in claim 15 wherein said means for selectively coupling is responsive to the signal to noise ratio of said auxiliary digital sound signal.

* * * * *